(12) United States Patent
Kumawat et al.

(10) Patent No.: US 12,639,654 B2
(45) Date of Patent: May 26, 2026

(54) SYSTEMS AND METHODS FOR SIMPLIFIED SUPPLY CHAIN MANAGEMENT

(71) Applicant: MASTERCARD INTERNATIONAL INCORPORATED, Purchase, NY (US)

(72) Inventors: Jaipal Singh Kumawat, Sikar (IN); Gurpreet Atwal, Chesterfield, MO (US); Shivani Magarkar, Tikari (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 62 days.

(21) Appl. No.: 18/651,617

(22) Filed: Apr. 30, 2024

(65) Prior Publication Data

US 2024/0370811 A1 Nov. 7, 2024

Related U.S. Application Data

(60) Provisional application No. 63/499,486, filed on May 1, 2023.

(51) Int. Cl.
*G06Q 10/08* (2024.01)

(52) U.S. Cl.
CPC .................................... *G06Q 10/08* (2013.01)

(58) Field of Classification Search
None
See application file for complete search history.

(56) References Cited

U.S. PATENT DOCUMENTS

| 6,578,014 | B1 | 6/2003 | Murcko, Jr. | |
| 7,822,682 | B2 | 10/2010 | Arnold et al. | |
| 8,484,129 | B2 | 7/2013 | Holm et al. | |
| 9,129,276 | B1 * | 9/2015 | Fasoli ................. | G06Q 20/203 |
| 9,213,965 | B1 * | 12/2015 | Brooks ............... | G06Q 20/085 |
| 10,115,098 | B2 | 10/2018 | Duncan | |
| 2017/0372264 | A1 * | 12/2017 | Tang .................... | G06Q 20/208 |

FOREIGN PATENT DOCUMENTS

| CN | 101604333 A | * 12/2009 | ........... G06Q 10/087 |
| JP | 2024528363 A | * 7/2024 | ........... G06Q 10/087 |

* cited by examiner

*Primary Examiner* — Fateh M Obaid
(74) *Attorney, Agent, or Firm* — Barta Jones, PLLC

(57) ABSTRACT

Examples provide methods for managing inventory exchanges between suppliers and merchants. The method includes transmitting a unit code associated with a unit of product to a supplier, where the unit code is a machine-readable image that embeds a unit identifier (ID) allocated to individual units of product; receiving a message that includes the unit ID having been extracted from the unit code by a first scanning device; automatically performing a procurement transaction from the merchant to the supplier for a stocking price, being a first portion of a wholesale price associated with the unit of product; receiving, from the merchant upon detection of a retail sale of the unit of product, a sale message that includes the unit ID; and automatically performing a supplier share transaction from the merchant to the supplier for a remainder price, the remainder price being a second portion of the wholesale price.

20 Claims, 5 Drawing Sheets

500

SYSTEMS AND METHODS FOR SIMPLIFIED SUPPLY CHAIN MANAGEMENT

CROSS-REFERENCE TO RELATED APPLICATIONS

This application claims the benefit of U.S. Provisional Patent Application No. 63/499,486 filed on May 1, 2023, which is hereby incorporated by reference herein in its entirety.

BACKGROUND

In supply chain management and inventory control, the procurement of items from suppliers or manufacturers marks the beginning of a financial cycle for a retail merchant. Conventionally, the merchant purchases units of goods from the supplier or manufacturer at wholesale prices and presents these goods for sale (e.g., via an online website or a "brick-and-mortar" store). This procurement often involves upfront payments from the merchant or an extension of credit between the supplier/manufacturer and the merchant (as in a direct purchase). Such a purchasing arrangement directly impacts the cash flow or credit position of the merchant. A consignment arrangement allows the merchant to offer units of product for sale while the supplier retains ownership until they are sold. However, such consignment purchasing shifts the up-front financial burden from the merchant back to the supplier. Further, a consignment arrangement also means that the suppliers need to trust the merchants to sell their goods efficiently and handle them properly. For the merchant, efficient inventory management involves balancing the stocking costs of inventory against customer demand for the product. If the inventory management cycle within a retail operation is not balanced correctly, the merchant faces significant risks that can jeopardize its stability and long-term viability.

SUMMARY

Some examples provide an inventory management system. The inventory management system includes at least one processor; and at least one memory comprising computer-readable instructions, the at least one processor, the at least one memory and the computer-readable instructions configured to cause the at least one processor to: transmit a unit code associated with a unit of product to a first computing device, the unit code being a machine-readable image that embeds a unit identifier (ID) uniquely allocated to the unit of product; receive a first message that includes the unit ID, the unit ID having been extracted from a first scan of the unit code by a first scanning device; automatically perform a first transaction from a first party and to a second party for a stocking price for the unit of product upon receipt of the first message, the stocking price being a first portion of a wholesale price associated with the unit of product; receive a second message that includes the unit ID, the unit ID having been extracted from a second scan of the unit code by a second scanning device at a point of sale for the unit of product; and automatically perform a second transaction from the first party to the second party for a remainder price for the unit of product upon receipt of the second message, the remainder price being a second portion of the wholesale price.

Some examples provide a computer-implemented method for managing inventory exchanges between a supplier and a merchant. The computer-implemented method includes:

transmitting a unit code associated with a unit of product to a supplier computing device, the unit code being a machine-readable image that embeds a unit identifier (ID) allocated to the unit of product; receiving, from the supplier computing device, a ship message that includes the unit ID, the unit ID having been extracted from a first scan of the unit code by a first scanning device; automatically performing a procurement transaction from the merchant to the supplier for a stocking price for the unit of product upon receipt of the ship message, the stocking price being a first portion of a wholesale price associated with the unit of product; receiving, from a merchant computing device upon detection of a retail sale of the unit of product, a sale message that includes the unit ID, the unit ID having been extracted from a second scan of the unit code by a second scanning device at a point of sale during the retail sale; and automatically performing a supplier share transaction from the merchant to the supplier for a remainder price for the unit of product upon receipt of the sale message, the remainder price being a second portion of the wholesale price.

Some examples provide a computer storage medium having computer-executable instructions that, upon execution by a processor of a computer, cause the processor to at least: transmit a unit code associated with a unit of product to a first computing device, the unit code being a machine-readable image that embeds a unit identifier (ID) uniquely allocated to the unit of product; receive a first message that includes the unit ID, the unit ID having been extracted from a first scan of the unit code by a first scanning device; automatically perform a first transaction from a first party and to a second party for a stocking price for the unit of product upon receipt of the first message, the stocking price being a first portion of a wholesale price associated with the unit of product; receive a second message that includes the unit ID, the unit ID having been extracted from a second scan of the unit code by a second scanning device at a point of sale for the unit of product; and automatically perform a second transaction from the first party to the second party for a remainder price for the unit of product upon receipt of the second message, the remainder price being a second portion of the wholesale price.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings. Any of the figures may be combined into a single example or embodiment.

DETAILED DESCRIPTION

Figure 1:
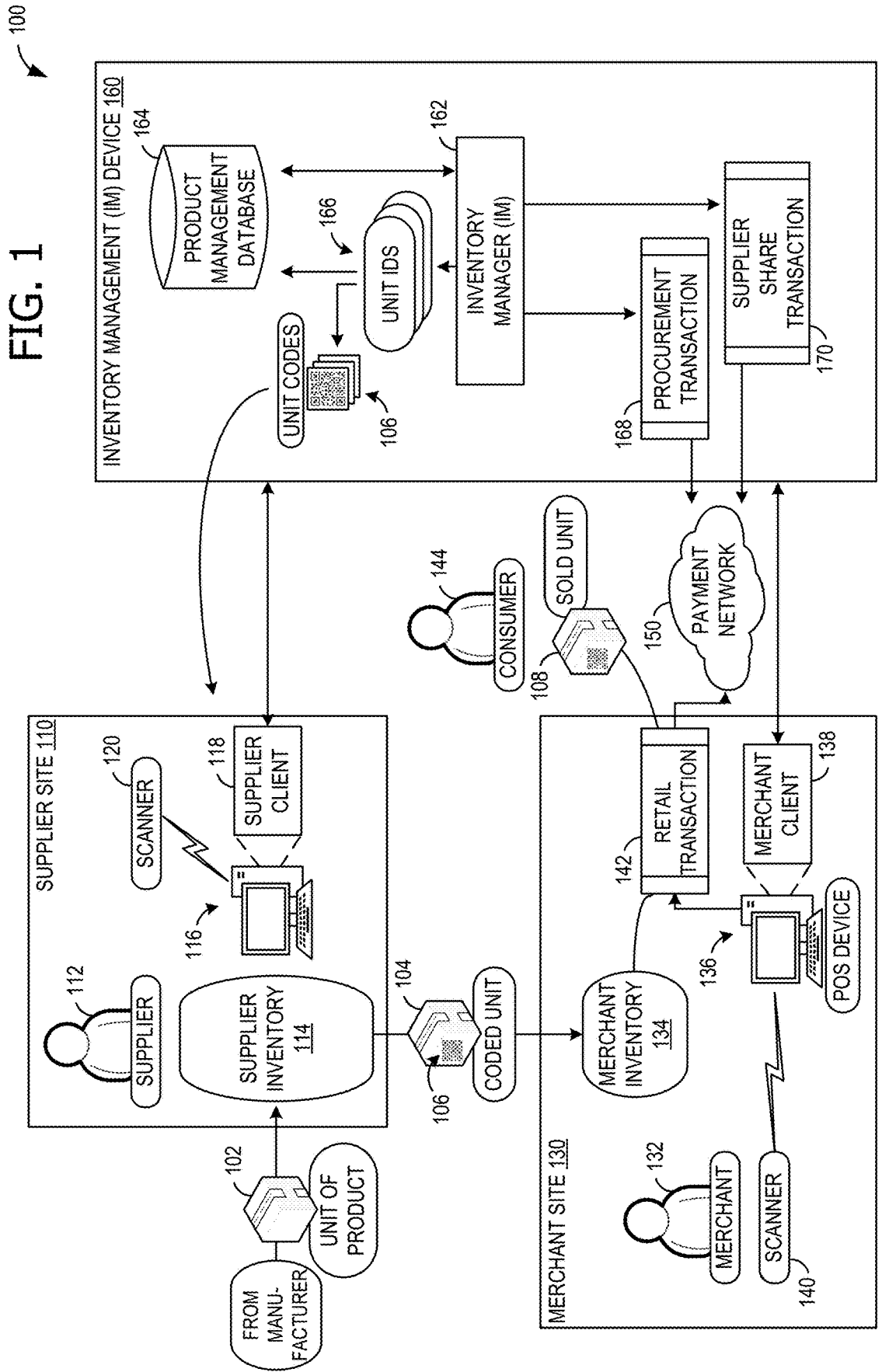
FIG. 1 is an architecture diagram illustrating an exemplary inventory management (IM) system that is used to manage inventory and wholesale transfers between merchants and product suppliers.

Acquisition of product inventory typically involves a merchant purchasing products from suppliers or directly from the product manufacturers (e.g., paying an up-front, wholesale price at the time of stocking). Once in inventory, the merchant then offers these products for sale to consumers (e.g., via conventional "brick-and-mortar" retail stores, online retail websites, or the like). Such inventory acquisition or "stocking" involves a large upfront investment by the merchant, which can cause cash flow issues for the merchant and may leave them open to other financial risks. In addition, the expansion of the merchant business may be challenging due to the large upfront cost of opening up a new location or adding product inventory.

To solve these and other technical problems associated with inventory management between suppliers and merchants, an example inventory management (IM) system is provided. The IM system generates a unique code (a "unit code") for each unit of product that is exchanged between the suppliers and merchants. The unit code, in examples, is a machine-readable optical image (e.g., a Quick Response (QR) code or the like) that encodes a unique ID for that unit of product (a "unit ID"), as well potentially other data associated with the unit, such as a product type or a UPC code. Each unit code is thus affixed to a respective individual unit at the supplier/wholesaler or at the manufacturer (e.g., as a sticker placed over a conventional UPC code on the unit), allowing that individual unit to be scanned at various stages of the supply chain until that unit is sold, thus allowing the IM system to manage aspects of inventory control, exchange, and tracking between the supplier(s) and merchant(s) until that particular unit is sold.

More specifically, when a merchant submits an order for a quantity of units of a particular product from a supplier, the supplier selects and scans that number of particular units (e.g., the affixed unit codes) to fulfill the order (e.g., as the supplier is preparing the units for shipping to the merchant). A supplier client device identifies the unit IDs of each of the scanned unit codes and transmits a list of the unit IDs to an IM device (e.g., a centralized service that manages inventory exchanges between the supplier and the merchant for these particular products). Upon receipt of the unit list, the IM device updates a product management database of product data to identify that those particular unit codes have been allocated to the merchant, and are currently being shipped to that merchant. The product management database thus stores the unique unit IDs/unit codes of each of the units of product managed by the IM system, thus allowing the IM device to identify product data for the particular unit (e.g., product type, manufacturer, UPC code, and the like), unit inventory data for that unit (e.g., an associated supplier/manufacturer, a targeted merchant, a state of that unit, and the like), and unit transaction data for that unit (e.g., terms of exchange for that unit, completed transaction(s) data involving that unit).

Upon receipt of the unit(s) at the merchant, the merchant scans each of the unit codes with a scanning device, thereby identifying each of the unit IDs received into the inventory of the merchant. A merchant client device transmits a stocking message to the IM device that includes all the unit IDs, thereby identifying receipt of those particular units at the merchant. Further, in some examples, the IM system performs a procurement transaction between the merchant (as buyer) and the supplier (as seller) for some portion of the wholesale price for each of the units. The IM system facilitates the wholesale purchase process between the merchant and the supplier by allowing the parties to establish a wholesale purchase agreement that identifies various terms of sale for units of particular products. In examples, these terms include a wholesale price per unit of a given type of product, as well as a procurement portion or "stocking price" (e.g., a percentage, fraction, or some other portion less than or equal to the wholesale price). This procurement portion represents how much of the wholesale price the merchant will pay to the supplier during initial stocking. At the time the supplier sends the units to the merchant (or at the time the merchant receives the units), the IM device determines a stocking price for the units and automatically performs a "procurement transaction" for those units (e.g., via a payment network, transferring that portion of the total wholesale price from the merchant to the supplier). As such, after the procurement transaction, the IM system has facilitated payment of some portion of the wholesale price from the merchant to the supplier.

When one or more of those units are sold by the merchant, the unit code(s) of the sold units are scanned by the merchant (e.g., at a point-of-sale (POS) device), and a retail transaction is performed between the merchant (as seller) and the consumer (as buyer) (e.g., via a payment network). At this time, the merchant client device transmits a sale message to the IM device identifying the sale of one or more unit IDs. The IM device updates those units as sold in the product management database and automatically executes a supplier share transaction that transfers the remainder of the wholesale price from the merchant to the supplier. This remainder, or "supplier share price", is the difference between the wholesale price of the unit and the portion already paid during stocking (e.g., the stocking price from the procurement transaction). As such, the sale of each particular unit causes an automatic payment to occur between the merchant (which received full value from the retail transaction) and the supplier, thus satisfying the entirety of the wholesale price for that sold unit and making the supplier whole.

The conventional computing device operates in an unconventional manner by creating unique unit IDs and associated unit codes for individual units of product and using those unit IDs and unit codes to track the units as they move through a supply chain. The generation and transmitting of unit codes associated with a unit of product to a supplier allows the supplier to affix the unit codes to units of product, and to subsequently scan those machine-readable images, which embed the unit ID, to identify that particular unit within the system. While the coded units are at the supplier, the scanning of these unit codes extracts the unit IDs and triggers an automatic transaction between a merchant (receiving the units) and a supplier (providing the units). This automatic performance of a procurement transaction (e.g., controlling a device) for a stocking price allows the merchant to automatically compensate the supplier for a portion of the wholesale price for the unit. Upon a retail sale of the units, the unit code(s) are again scanned at a point-of-sale device, and the unit IDs are identified therein by the scan. This retail sale triggers another automatic transaction (e.g., controlling a device) that transfers the remainder of the wholesale price from the merchant to the supplier after the retail sale is complete. As such, the system reduces network traffic between supplier, merchant, and the system by, for example, bundling multiple unit codes and unit IDs into individual messages between the parties. Further, computational load on the payment network is reduced as several units can be combined into individual transactions.

FIG. 1 is an architecture diagram illustrating an exemplary inventory management (IM) system 100 that is used to manage inventory and wholesale transfers between merchants and product suppliers. In examples, the IM system 100 provides an IM device 160 that manages aspects of inventory control between a supplier 112 (e.g., a wholesaler of products) and a merchant 132. More specifically, the IM device 160 generates and allocates unique identifiers (IDs), "unit IDs" 166, for each unit of product that is tracked by the system 100. These unit IDs 166 are embodied into "unit codes" 106 (e.g., machine-readable optical images, such as QR codes) that are affixed to individual units of product, thus allowing the system 100 to individually identify each particular unit, and to automatically perform various inventory management and wholesale transaction operations during the supply chain cycle between such participants.

The supplier 112 manages a supplier inventory 114 of various products at a supplier site 110 (e.g., a wholesale distribution center of a wholesaler, a finished goods inventory of a manufacturer, or the like). In this example, the supplier 112 is a wholesaler or distributor that is presumed to perform purchases of units of various products from various manufacturers, and to stock those units (e.g., in the supplier inventory 114) until being allocated/sold/shipped to various merchants, such as the merchant 132. In other examples, the supplier 112 may be a product manufacturer. These units of product, as initially received from the manufacturer(s), are referred to herein as "uncoded units", or just "units" 102, where each unit 102 is presumed to be an individual instance of a product (e.g., a retail packaging of a single item of some type of product). Further, in some examples, these units 102 may include one or more of a Universal Product Code (UPC), a Stock Keeping Unit (SKU) code, or the like, that can be used to identify certain aspects of the product, such as, in the case of UPCs, a particular manufacturer (e.g., a 5-digit manufacturer code unique to various manufacturers) and a particular product code (e.g., a 5-digit product code assigned to a particular type of product made by that manufacturer). In examples, these "native" codes are replaced or supplemented by the unit codes 106 provided by the IM device 160, as described in further detail herein.

In the example, the supplier 112 operates a supplier computing device 116 that is configured to execute a supplier client 118 (e.g., a software application) that interfaces with the IM device 160 during operation. During operation, the supplier 112 requests new unit codes 106 from the IM device 160 for new units 102 in their inventory 114. This new unit code request (not shown in FIG. 1) includes, for example, product data for the particular unit(s) (e.g., UPC, manufacturer ID, product type ID, or the like), supplier data (e.g., a supplier ID uniquely identifying the supplier 112), and a requested quantity of new unit codes 106.

The IM device 160 provides an inventory manager (IM) 162 that, in response to the supplier request, is configured to generate new unit IDs 166 in the quantity requested, and for the particular product type(s) identified. More specifically, for each new unit code 106 requested, the IM device 160 generates a new unique unit ID 166 (e.g., a unique numeric or alpha-numeric code). This unit ID 166 is effectively created for, and assigned to, a particular unit 102 of product. Further, for each new unit ID 166, the IM device 160 also generates a new unit code 106. The unit code 106 is a machine-readable code that embeds at least the unit ID 166 within the unit code 106. In examples, the unit code 106 is a QR code, and the data within the QR code includes the unit ID 166. Each of these new unit codes 106 are sent to the supplier computing device 116 in response to the request. The supplier 112 may thus print these unit codes 106 and affix each of these unit codes 106 to the associated units 102 for which they were requested. In examples, the unit codes 106 are printed as stickers that are affixed to the unit 102 (e.g., over the UPC, aside the UPC, or otherwise). As such, once attached to the particular unit 102, each unit 102 has a unit code 106 that allows that unit 102 to be uniquely identified within the IM system 100. These uncoded units 102 become "coded units" 104, where each coded unit 104 includes a unique unit code 106, as shown in FIG. 1.

In examples, the supplier 112 also operates a scanner device (or just "scanner") 120. The scanner 120 is an imaging device that is configured to read codes such as 1D codes (e.g., UPCs) and/or 2D codes (e.g., QR codes, unit codes 106, or the like), each of which embed data that can be determined (e.g., read) by the scanner 120. As such, the scanning of a particular unit code 106 allows the scanner 120 and/or the supplier computing device 116 (e.g., via wired or wireless communication with the scanner 120) to extract the unit ID 166 from the unit code 106.

During operation, when the supplier 112 receives an order from the merchant 132 for a particular quantity of a particular product type, the supplier 112 identifies that number of coded units 104 of that product type and scans those coded units 104 with the scanner 120. For example, the supplier 112 may scan each of the coded units 104 while preparing a package to send to the merchant site 130. As such, the supplier client 118 updates the IM device 160 with the particular unit IDs 166 based on those scanned codes 106, thereby allowing the IM device 160 to update the state of those particular unit IDs 166 in a product management database (DB) 164.

Further, in examples, upon identification of those particular coded units 104, the IM 162 automatically performs a procurement transaction 168 for that quantity of units 104. The procurement transaction 168 represents a transaction between the merchant 132 (as purchaser) and the supplier 112 (as seller) for a portion of the wholesale price for that quantity of units 104. For example, presume the supplier 112 and merchant 132 have agreed that the merchant 132 will pay 40% of wholesale price at the time of procurement (e.g., at time of stocking, prior to consumer sale), with the remaining 60% of wholesale price to be paid upon consumer sale. As such, the procurement transaction 168 is performed (e.g., via the payment network 150) at a procurement transaction amount of num_units*(wholesale_px*0.40). In other words, in this example, the merchant 132 pays 40% of the wholesale price at the time the units 104 are shipped from the supplier 112.

In the example, the merchant 132 scans the unit codes 106 of each of the coded units 104 upon receiving those units 104 into merchant inventory 134. More specifically, the merchant 132 operates a scanner device (or just "scanner") 140 (e.g., similar to the scanner 120) and a merchant computing device (or "POS device") 136. The POS device 136 executes a merchant client (e.g., a software application) that allows the POS device 136 to interface with the IM device 160 for the operations described herein. Upon scanning of the coded units 104 into merchant inventory 134 via the scanner 140, the POS device 136 updates the IM device 160 with the unit IDs 166 of the received units 104. As such, the merchant 132 offers the coded units 104 for sale via the merchant site 130. In some examples, the merchant 132 is an "in-person" retailer, the merchant site 130 is a brick-andmortar retail location or the like (e.g., kiosk, mobile vendor, direct sales), and thus the coded units 104 may be presented directly for sale to consumers 144. In other examples, the merchant 132 may be a remote retailer, such as an online retailer (e.g., conducting online sales through the Internet), a catalog retailer (e.g., offering orders via telephone, mail), a wholesale merchant, or the like, and the merchant site 130 is a warehouse or other location where the merchant 132 stores coded units 104 prior to subsequent sale (e.g., sale to consumers 144).

In the example, a consumer 144 selects a coded unit 104 from the merchant inventory 134 and initiates a sale with the merchant 132. At the time of the sale, the merchant 132 scans the unit code(s) 106 of the coded unit(s) 104 via the scanner 140 or another similar scanner of the POS device 136. The POS device 136 performs a retail transaction 142 that includes the coded unit 104 (e.g., as a cash transaction, as a payment card transaction via the payment network 150, or the like). The POS device 136 may operate a payment system (not separately shown) that scans items (e.g., via UPC, unit code 106, or the like), identifies retail item prices, calculates total purchase price, computes taxes, performs payment processing (e.g., via cash, credit/debit/gift card, mobile payment methods, or the like), printing receipts, and the like. In some examples, the POS device 136 identifies UPC for a coded unit 104 via scanning of the unit code 106 (e.g., where the UPC is embedded within the unit code 106). In some examples, any of the item-level details for the coded unit 104 may be identified by the IM device 160 based on the unit ID 166. As such, the coded unit 104 is sold to the consumer 144, thus becoming "sold unit" 108 in FIG. 1.

Upon completion of the retail transaction 142, in examples, the POS device 136 also updates the IM device 160, indicating that the particular coded unit(s) 104 have been sold. These particular unit IDs 166 are thus updated in the DB 164 as sold. Further, the IM 162 also automatically performs a supplier share transaction 170 in response to the sale. More specifically, the IM 162 determines a supplier share price for this transaction 170 (e.g., the unpaid remainder of the wholesale price for the sold unit(s)). Continuing the above example, upon sale of one or more units 104, the merchant 132 pays the supplier 112 the remaining 60% of the wholesale price (for each sold unit) after the consumer sale. In this example, the supplier share transaction includes the merchant 132 paying the supplier 112 in the amount of num_sold_units*(wholesale_px*0.60). As such, at any given time, the merchant 132 has effectively paid the supplier 112 the entirety of the wholesale price for each of the sold units (e.g., the procurement transaction price+the supplier share transaction price), but only a portion of the wholesale price for any remaining unsold units (e.g., only the procurement transaction price).

Figure 2:
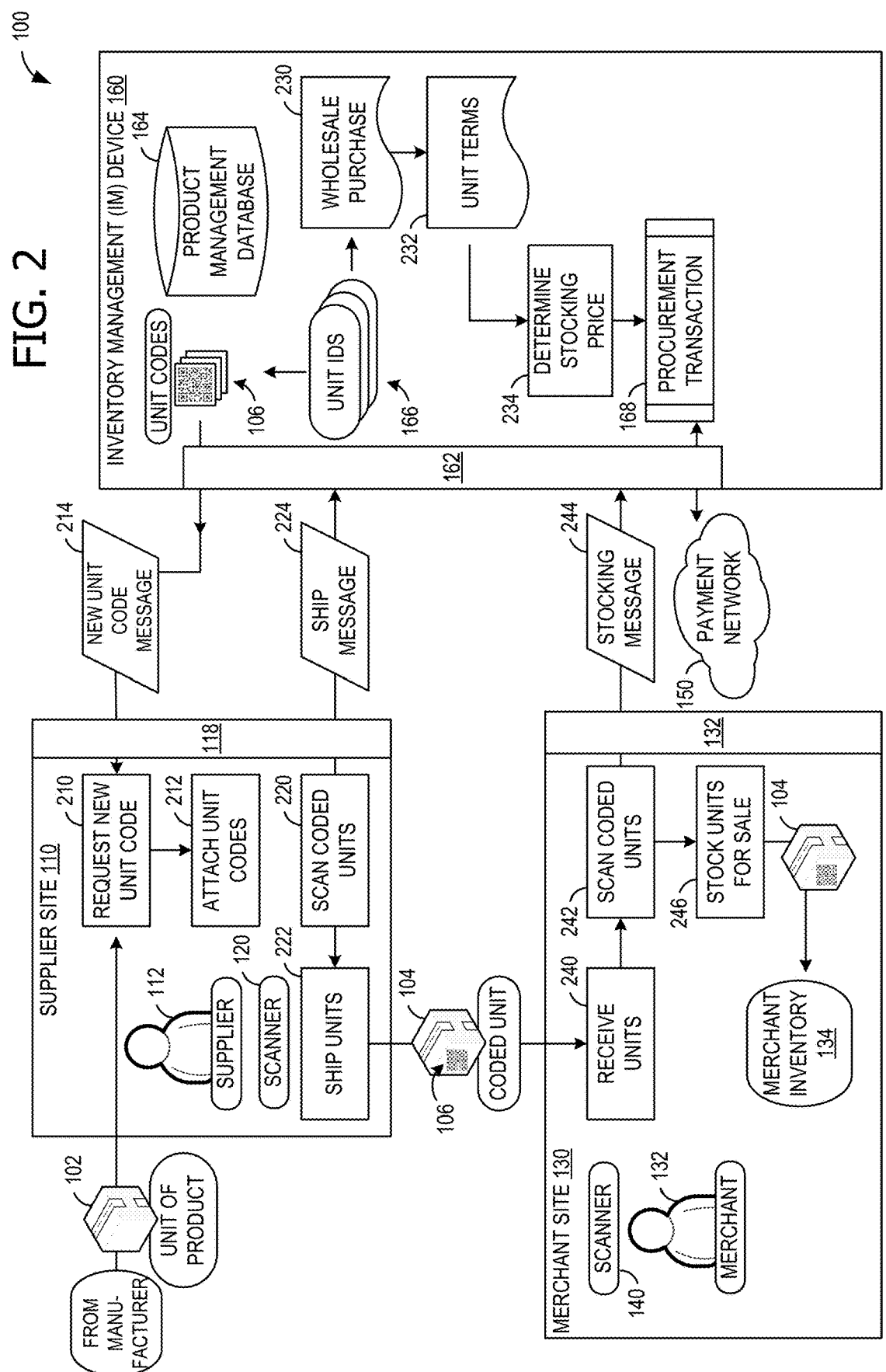
FIG. 2 illustrates operational details performed during wholesale distribution of units between the supplier and the merchant (e.g., prior to offering the coded products for retail sale).
Figure 3:
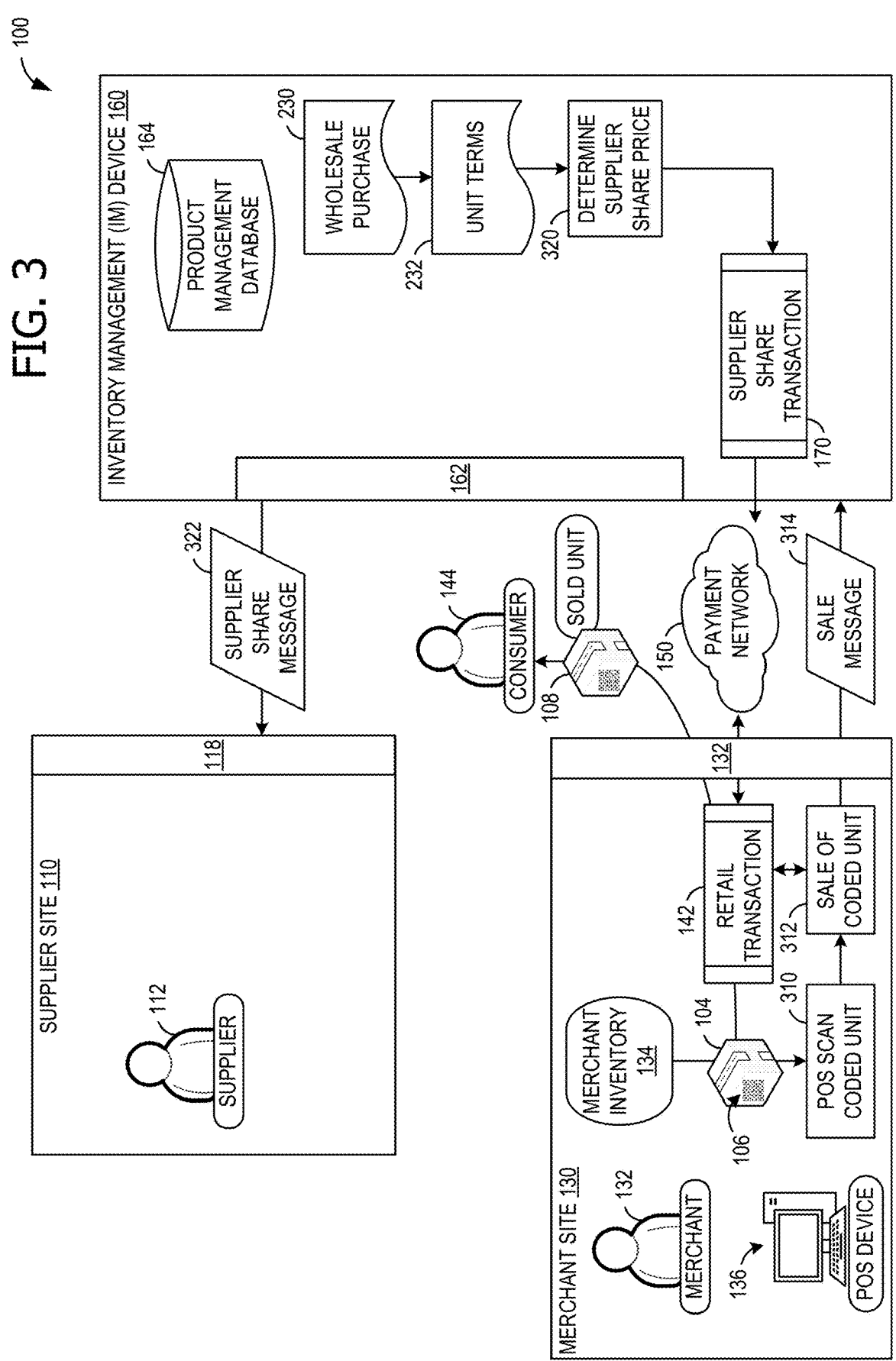
FIG. 3 illustrates operational details performed during and after retail sale of coded units to the consumer.

While the examples shown in FIG. 1, FIG. 2, and FIG. 3 show only a single supplier and a single merchant, it should be understood that the IM system 100 can support any number of suppliers, any number of merchants, and any number of relationships between such parties. Further, while the examples shown in FIG. 1, FIG. 2, and FIG. 3 illustrate only a two-tier supply chain (e.g., a supplier 112 selling to a merchant 132), it should be understood that the systems and methods described herein can support additional tiers within the supply chain (e.g., adding a manufacturer selling to the supplier 112, adding another supplier/distributor/wholesaler before the product arrives at the merchant 132).

FIG. 2 and FIG. 3 illustrate additional operational details of the IM system 100 during supply chain interactions and transactions. More specifically, FIG. 2 illustrates additional operational details performed during wholesale distribution of units 104 between the supplier 112 and the merchant 132 (e.g., prior to offering the coded units 104 for retail sale), and FIG. 3 illustrates additional operational details performed during and after retail sale of coded units 104 to the consumer 144. It should be understood that certain components of the IM system 100 are excluded from FIG. 2 and FIG. 3 for purposes of clarity.

Referring now to FIG. 2, in the example, the supplier 112 is shown receiving units 102 of product from a manufacturer. At operation 210, the supplier client 118 requests a batch of new unit codes 106 (e.g., including new unit IDs 166) from the IM device 160. This operation 210 includes transmitting a new unit code request message (not shown) to the IM device 160 that identifies, for example, a number of new unit codes 106 requested, a product type associated with the new unit code(s) 106 (e.g., a UPC, a manufacturer ID, a product type ID, or the like, of the new units 102), an ID of the supplier 112 (e.g., a unique ID assigned to the supplier amongst other parties of the IM system 100), and perhaps other product data to be associated with the new units 102 (e.g., a default wholesale price for that product type). The IM 162 thus generates new unit IDs 166 for the request, storing each new unit ID 166, as well as associated data identified in the request, in the DB 164. In the example, the IM 162 also generates the unit codes 106, each of which embeds the associated unit ID 166, as well as possibly additional data, such as UPC for the product type. The IM 162 responds to the supplier client 118 with a new unit code message 214 that includes the new unit codes 106. In other examples, the message 214 includes the new unit IDs 166, and the supplier client 118 generates the new unit codes 106 using the new unit IDs 166.

At operation 212, the supplier client 118 prints the new unit codes 106 (e.g., as 2D image on a sticker or other medium) and the supplier 112 thus attaches these new unit codes 106 to the new units 102 of product (e.g., one unit code 106 per unit 102). As such, each new unit 102 now includes a unit code 106 and unit ID 166 specific to that unit 102, making each unit 102 individually identifiable and trackable within the IM system 100. In other words, each unit 102 becomes a coded unit 104 upon receiving one of the new unit codes 106. In examples, the IM 162 tracks a state of each unit 102 via a state code stored in the DB 164 for that unit 102. At this first state (e.g., an "in supplier inventory" state), the new units 102 are stored in the supplier inventory 114 (shown in FIG. 1) as coded units 104 (e.g., the original new units 102, now having the unit codes 106 also attached) and await allocation to a particular merchant 132 or other purchaser.

In this example, the supplier 112 and the merchant 132 negotiate terms of purchase for products of the example product type. For example, presume the new units 102 are flatscreen televisions of a particular make/model from an example electronics manufacturer, the supplier 112 is an electronics distributor, and the merchant 132 is a retail appliance and electronics that offers both brick-and-mortar retail locations as well as online sales of such electronics. As such, the merchant 132 and supplier 112 agree to terms for a wholesale purchase 230 for a particular quantity of those televisions at some particular wholesale price. The terms of this wholesale purchase include unit terms 232, for example, the wholesale price for new units 102 of this product type (e.g., a price agreed to between the supplier 112 and merchant 132, perhaps discounted from some default wholesale price based on agreement, past purchase history, future purchase quantity commitments, or the like).

Further, in examples, the unit terms 232 also include procurement data that identifies how much the merchant 132 is obligated to pay to stock new units 102 of the product (e.g., via the procurement transaction 168). In some examples, the procurement data is a procurement percentage (e.g., a percentage or fractional value that is used to determine what portion of the wholesale price the merchant 132 pays when stocking new units of this product type from this supplier 112). In some examples, the procurement data is a stocking price (e.g., a predetermined price per unit that the merchant 132 pays when stocking new units, some price less than or equal to the wholesale price). The IM 162 allows the supplier 112 and merchant 132 to negotiate these unit terms 232 for various types of product, store these unit terms 232 for various types of product, and to initiate wholesale purchases 230 for particular orders, all of which may be stored in the DB 164.

In this example, presume the merchant 132 has entered a wholesale purchase 230 for ten televisions of a particular manufacturer, make, and model, and that the unit terms 232 agreed between the supplier 112 and merchant 132 include a (total) wholesale price of $1,500 per unit, and a procurement percentage of 40%. As such, the merchant 132 is obligated to pay a stocking price of 40% of the wholesale price, $1,500, for each unit at stocking time (e.g., when initially ordered, shipped, or received by the merchant 132). In other words, the stocking price for each unit is $1,500*0.40=$600 per unit. For this particular wholesale purchase 230, the total stocking price is thus $600*10 units=$6,000 for this example.

Back at the supplier 112, the supplier 112 receives the wholesale purchase 230 from the merchant 132 for the ten televisions. At operation 220, the supplier 112 identifies ten coded units 104 from the supplier inventory 114 and scans those coded units 104 (e.g., scanning the unit codes 106 of ten televisions from their inventory that match the manufacturer, make, and model associated with the new unit codes 106). In some examples, upon scanning each unit code 106, the supplier client 118 identifies the manufacturer, make, and model associated with the scanned unit code 106 and compares that data with product type data identified in the wholesale purchase 230 (e.g., to ensure that the product data for that unit 104 matches the wholesale purchase 230). In situations where the product data for the coded unit 104 does not match the product data identified in the wholesale purchase 230, the supplier client 118 causes the scanner 120 to display or otherwise present an error indicator to the supplier 112 (e.g., as a audible indicator or visual indicator on the scanner 120). In some examples, upon scanning a coded unit 104, the scanner 120 is configured to display product data for that unit code 106 (e.g., manufacturer, make, model, as memorialized in the DB 164), thereby allowing the supplier 112 to verify that the actual unit 104 matches what the IM device 160 has associated with the code 106 attached to that unit 104 (e.g., visually comparing the manufacturer, make, model data on the packaging of the unit 104 with the displayed data as read from the DB 164). In situations where the displayed product data does not match the real-life packaging of the unit 104, a mismatch between reality and the data of the DB 164 has been detected by the supplier 112 and may be remedied (e.g., by replacing the unit code 106 on the coded unit 104, by updating the DB 164, or the like).

After scanning the ten coded units 104, in the example, the supplier client 118 transmits a ship message 224 to the IM device 160. The ship message 224 acts as an indicator, to the IM device 160, that particular units 104 have been identified for allocation to the merchant 132 and/or the particular wholesale purchase 230. The ship message 224 identifies the ten unit IDs of the particular coded units 104 that were scanned by the supplier 112, as well as the supplier ID, and perhaps a merchant ID of the merchant 132 and/or a wholesale purchase ID of the wholesale purchase 230. Until now, these coded units 104 were in the "in supplier inventory" state in the DB 164. Upon receipt of the ship message 224, the IM 162 updates the DB 164, changing the state of each of these ten unit IDs to indicate a second state (e.g., an "allocated to merchant" state). This update to the DB 164, in examples, also update the records for those ten unit IDs 166 to indicate which merchant 132 that unit ID 166 has been allocated (e.g., by merchant ID) and/or which wholesale purchase 230 that unit ID 166 has been allocated (e.g., by wholesale purchase ID).

In addition to allocating those particular unit IDs 166 to that particular merchant 132 or wholesale purchase 230, the IM 162 also automatically performs the procurement transaction 168. More specifically, at operation 234, and in response to receiving the ship message 224, the IM 162 determines the stocking price for those ten units 104 by retrieving the unit terms 232 that have been arranged between this supplier 112 and this merchant 132. In this example, and as discussed above, the procurement data is a procurement percentage of 40% and, as such, the stocking price per unit is 40% of $1,500 (the wholesale price for that unit type), or $600. The total stocking price is thus $600*10 units, or $6,000. Accordingly, the total transaction amount for the procurement transaction 168 is $6,000, transferred from the merchant 132 to the supplier 112 via submission of that transaction 168 across the payment network 150. In examples, the IM 162 records transaction details for the procurement transaction 168 in the DB 164, and may update a transaction state of each of the ten unit IDs 166 and/or the wholesale purchase 230 to identify completion of the procurement transaction 168 for these ten units 104.

Returning again to the supplier site 110, the supplier 112 has thus set aside ten televisions for this merchant 132 and scanned those coded units 104. At operation 222, the supplier 112 ships those units 104 to the merchant site 130.

In the example, at operation 240, the merchant 132 receives the coded units 104 at the merchant site 130 and scans those coded units 104 at operation 242. Upon scanning those coded units 104, the merchant client 132 transmits a stocking message 244 to the IM device 160. The stocking message 244 includes at least the unit IDs 166 of those ten coded units 104 (e.g., as read by scanner 140). Upon receipt, the IM 162 updates the state of each of the unit codes 166 to a third state (e.g., "in merchant inventory") in the DB 164. In some examples, receipt of this stocking message 244 may cause the IM 162 to automatically perform the procurement transaction 168 as described above (e.g., in lieu of being performed at the time of the ship message 224). At operation 246, the coded units 104 are stocked and prepared for sale, and the merchant 132 places those coded units 104 in their merchant inventory 134.

Referring now to FIG. 3, and continuing the example, the ten televisions have been received into the merchant inventory 134 and are prepared for sale to consumers 144. Presume, for example, that the merchant site 130 is a brick-and-mortar store of the merchant 132 and the consumer 144 selects one of the televisions for purchase. As such, at operation 310, the merchant 132 scans the unit code 106 of this particular coded unit 104 at the POS device 136 (e.g., by scanner 140, or a similar scanner directly attached to the POS device 136). The POS device 136 performs a sales transaction between the merchant 132 and the consumer 144 at operation 312 (e.g., determining retail price(s) for this coded unit 104 and perhaps other items being concurrently purchased by the consumer 144, a tax amount, a total transaction amount, and the like). This retail exchange is consummated between the merchant 132 and the consumer 144 by the retail transaction 142 (e.g., as described in relation to FIG. 1). As such, the coded unit 104 becomes the sold unit 108, now in possession of and owned by the consumer 144.

Upon successful completion of this retail transaction 142, the merchant client 132 transmits a sale message 314 to the IM device 160. The sale message 314 identifies which unit ID(s) were sold by the merchant 132. In response to receipt of this sale message 314, the IM 162 automatically performs the supplier share transaction 170. More specifically, at operation 320, the IM 162 determines the supplier share price for that sold unit 108 (e.g., based on the unit terms 232, the wholesale price of this sold unit 108, the stocking price from the procurement transaction 168). In this example, the unit terms 232 for this sold unit 108 indicate that 40% of the wholesale price is to be paid (and was actually already paid) by the merchant during stocking, and thus the remaining 60% of the wholesale price is to be paid upon sale of the unit 108. As such, the supplier share price is the wholesale price minus the stocking price (e.g., $1,500–$600=$900), or 60% of the wholesale price (e.g., $1,500*0.60=$900). As such, the IM 162 performs the supplier share transaction 170 via the payment network 150, thus transferring the supplier share price from the merchant 132 to the supplier 112. The IM 162, in some examples, sends a supplier share message 322 to the supplier 112 indicating the sale of the sold unit 108 by the merchant 132.

In some situations, the unit terms 232 negotiated between the supplier 112 and the merchant 132 may exceed the wholesale price. For example, in lieu of "floating" 60% of the wholesale price by the supplier 112 while the units 104 are waiting to be sold (e.g., since the merchant only paid 40% of wholesale price at stocking time), the supplier 112 may negotiate to receive more than the remainder of the wholesale price at the time of sale (e.g., for a total of 105% wholesale, or for an additional fixed premium per unit sold, such as an additional $20 over wholesale).

As such, the retail sale of each sold unit 108 thus causes the IM device 160 to automatically perform the supplier share transaction 170, thus completing the wholesale transaction between the supplier 112 and the merchant 132, and thus making the supplier 112 whole. Further, the state of the sold unit 108 is updated in the DB 164 to a "sold" state, and the transaction state of the sold unit 108 and/or the wholesale purchase 230 is updated based on completion of the supplier share transaction (e.g., thereby indicating retail sale and wholesale completion of some portion of units associated with the purchase 230).

Referring now to FIG. 2 and FIG. 3, in some examples, details of the wholesale purchase 230 are included in the request for new unit codes at operation 210. For example, the supplier 112 may receive a direct purchase request from the merchant 132 (e.g., initially outside of the IM system 100). As such, the supplier 112 may enter details for the wholesale purchase 230 via the supplier client 118 (e.g., indicating the unit terms 232, product type data, quantity for the sale, merchant ID of the receiving merchant, and the like), thereby causing the IM 162 to generate the wholesale purchase 230 and unit terms 232 based on the received data, in addition to generating the unit IDs 166 and unit codes 106. As such, because the new unit IDs 166 and unit codes 106 are being specifically created for a particular wholesale purchase 230 and unit terms 232, those unit IDs 166 and unit codes 106 do not necessarily need to be scanned at operation 220 and associated with the purchase 230 in response to the ship message 224. This allows the supplier 112 to avoid the scanning prior to shipment.

In some examples, the supplier 112 may bundle multiple coded units 104 into a larger shipping container (referred to herein as "composite stocking"). As such, the supplier 112 may request a unit ID 166 and unit code 106 for a composite coded unit, namely a unit code 106 that is affixed to the shipping container (e.g., a larger box or the like), where the shipping container includes one or more coded units 104. In this example, the unit code 106 of the composite coded unit is scanned at operation 220 (e.g., after the coded units 104 have been scanned), and the supplier client 118 identifies the coded units 104 as being associated with (e.g., bundled into) the composite coded unit. In other words, the IM 162 identifies the unit code 106 of the shipping container as containing those particular coded units 104 (e.g., in a one-to-one or one-to-many relationship). As such, when the merchant 132 receives the composite coded unit, the merchant 132 scans only the unit code 106 of the shipping container (e.g., not the individual unit codes 106 of the coded units 104 within the shipping container). As such, the stocking message 244 contains the unit code 106 of the shipping container. Upon receipt, the IM 162 identifies that this unit code 106 is for a composite unit ID, and thus identifies all of the other unit IDs associated with that composite unit ID. For all of those "nested unit IDs", the IM 162 thus changes the state to reflect receipt by the merchant 132 of all of those coded units 104. Such composite stocking eases the scanning burden of the merchant 132 when receiving products from the supplier 112, reduces network traffic between the merchant client 132 and the IM 162 (e.g., by reducing the amount of data in stocking message 244, the number of stocking messages 244), and by bundling more units 104 into procurement transactions 168 to lessen the number of transactions performed on the payment network 150.

Figure 4:
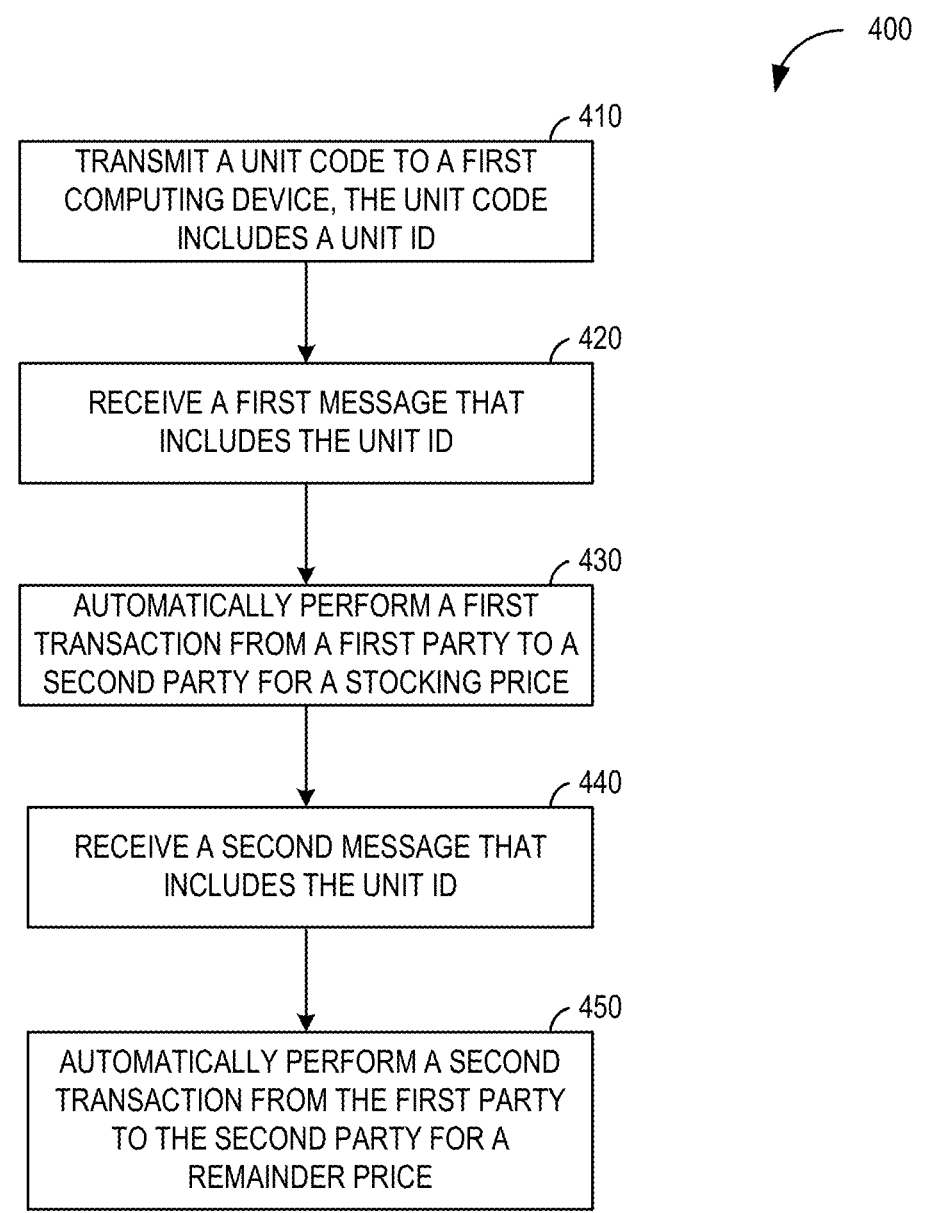
FIG. 4 is a flowchart of an example method for managing inventory exchanges between parties such as the supplier and the merchant of FIG. 1.

FIG. 4 is a flowchart of an example method 400 for managing inventory exchanges between parties such as the supplier 112 and the merchant 132 of FIG. 1. In some examples, the method 400 is performed by the IM device 160 within the IM system 100 of FIG. 1, and may include any of the operations described in FIG. 1, FIG. 2, and FIG. 3. In the example, at operation 410, the IM 162 (shown in FIG. 1, FIG. 2, and FIG. 3) transmits a unit code (e.g., unit code 106) associated with a unit of product (e.g., unit 102, 104, 108) to a first computing device (e.g., supplier computing device 116), the unit code being a machine-readable image that embeds a unit identifier (ID) (e.g., unit ID 166) uniquely allocated to the unit of product. At operation 420, the IM 162 receives a first message (e.g., ship message 224) that includes the unit ID, the unit ID having been extracted from a first scan of the unit code by a first scanning device (e.g., scanner 120).

At operation 430, in the example, the IM 162 automatically performs a first transaction (e.g., procurement transaction 168) from a first party (e.g., the merchant 132) and to a second party (e.g., the supplier 112) for a stocking price for the unit of product upon receipt of the first message, the stocking price being a first portion of a wholesale price associated with the unit of product. At operation 440, the IM 162 receives a second message (e.g., sale message 314) that includes the unit ID, the unit ID having been extracted from a second scan of the unit code by a second scanning device (e.g., scanner 140) at a point of sale (e.g., the merchant site 130) for the unit of product. At operation 450, the IM 162 automatically perform a second transaction (e.g., the supplier share transaction) from the first party to the second party for a remainder price (e.g., the supplier share price) for the unit of product (e.g., sold unit 108) upon receipt of the second message, the remainder price being a second portion of the wholesale price.

In some examples, the IM 162 also, upon receipt of a third message (e.g., a new unit code request message, not shown), generate the unit ID as a unique identifier, and generate the unit code as a 2-dimensional machine-readable image (e.g., a QR code), including embedding at least the unit ID within the unit code. In some examples, the third message includes product data associated with a type of product identifiable by at least a manufacturer identifier and a product type identifier (e.g., UPC code, manufacturer ID, product type ID), and the IM 162 also associates the unit ID with the product data (e.g., stores the product data in the row of the DB 164 of the unit ID), associates the unit ID with a second party identifier assigned to the second party (e.g., stores the supplier ID in the row of the unit ID), and determines the stocking price based on the product data associated with the unit ID, wherein automatically performing the first transaction further includes identifying the second party based on the unit ID.

In some examples, the first message includes a first party identifier assigned to the first party, and the IM 162 also, upon receipt of the first message, assigns the unit ID to the first party, and wherein automatically performing the second transaction further includes identifying the first party based on the unit ID.

In some examples, the IM 162 also stores unit terms (e.g., unit terms 232) assigned to exchanges between the first party and the second party of a product type, the unit terms including at least procurement data defining how the stocking price is determined, identifies that the unit ID is associated with the product type, and determines the stocking price for the first transaction based on the unit terms. In some examples, the unit terms further include a wholesale price, the procurement data includes a procurement percentage, and determining the stocking price includes multiplying the procurement percentage by the wholesale price.

In some examples, the IM 162 also transmits a composite unit code to the first computing device, the composite unit code being associated with a plurality of unit IDs, receive a third message (e.g., the stocking message 244) that includes the composite unit code, identifies the plurality of unit IDs based on the composite unit code, and updates the plurality of unit IDs as having been received by the first party.

Exemplary Operating Environment

Figure 5:
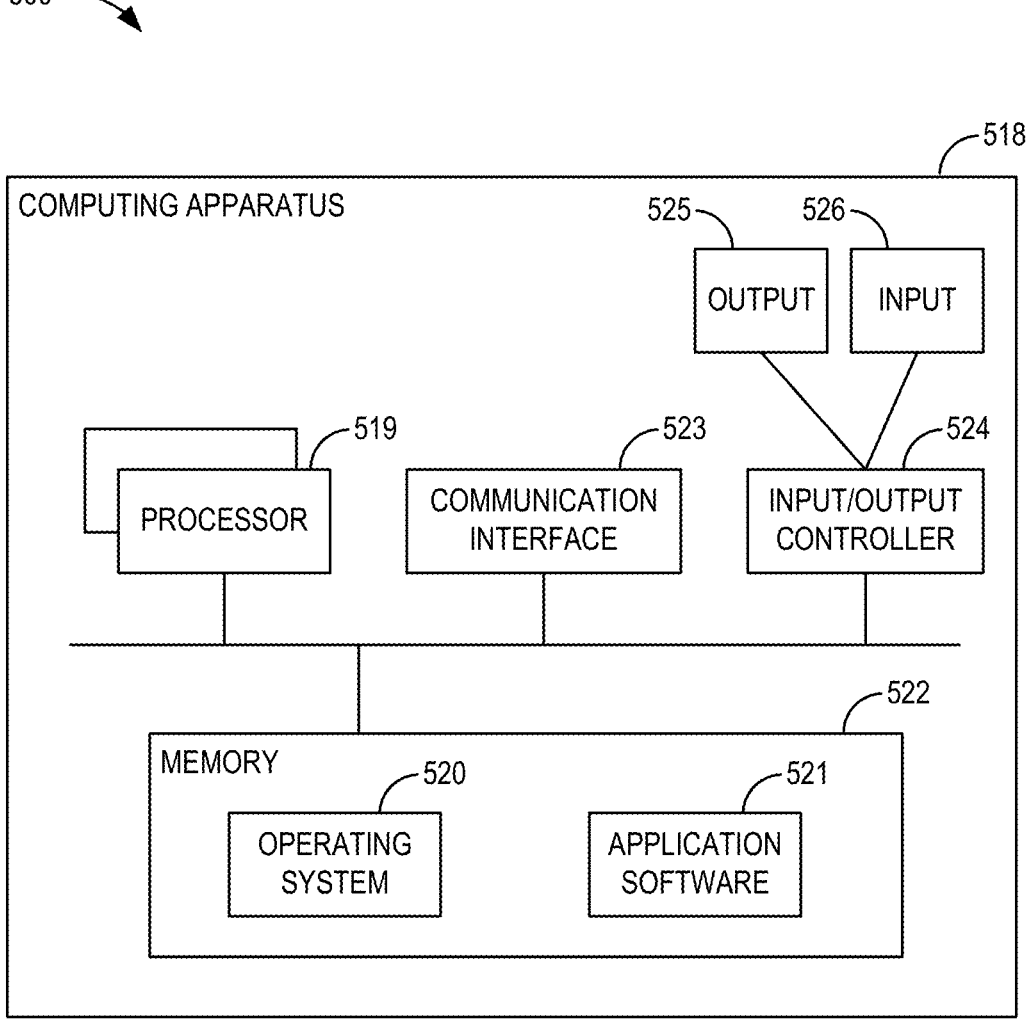
FIG. 5 illustrates a computing apparatus according to an embodiment as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 is a computing device, such as, but not limited to, the supplier computing device 116, the merchant computing device (POS computing device) 136, the IM device 160, or the scanners 120, 140 of FIG. 1.

The computing apparatus 518 comprises one or more processors 519 which can be microprocessors, controllers, or any other suitable type of processors for processing computer executable instructions to control the operation of the electronic device. Alternatively, or in addition, the processor 519 is any technology capable of executing logic or instructions, such as a hardcoded machine. In some examples, platform software comprising an operating system 520 or any other suitable platform software is provided on the apparatus 518 to enable application software 521 to be executed on the device.

In some examples, computer executable instructions are provided using any computer-readable medium or media accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 in other examples outputs data to devices other than the output device, e.g., a locally connected printing device. In some examples, a user provides input to the input device(s) 526 and/or receives output from the output device(s) 525.

The functionality described herein can be performed, at least in part, by one or more hardware logic components. The computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a- chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

ADDITIONAL EXAMPLES

In some examples, an inventory management system is provided. The inventory management system includes at least one processor; and at least one memory comprising computer-readable instructions, the at least one processor, the at least one memory and the computer-readable instructions configured to cause the at least one processor to: transmit a unit code associated with a unit of product to a first computing device, the unit code being a machine-readable image that embeds a unit identifier (ID) uniquely allocated to the unit of product; receive a first message that includes the unit ID, the unit ID having been extracted from a first scan of the unit code by a first scanning device; automatically perform a first transaction from a first party and to a second party for a stocking price for the unit of product upon receipt of the first message, the stocking price being a first portion of a wholesale price associated with the unit of product; receive a second message that includes the unit ID, the unit ID having been extracted from a second scan of the unit code by a second scanning device at a point of sale for the unit of product; and automatically perform a second transaction from the first party to the second party for a remainder price for the unit of product upon receipt of the second message, the remainder price being a second portion of the wholesale price.

In some examples, a computer-implemented method for managing inventory exchanges between a supplier and a merchant is provided. The computer-implemented method includes: transmitting a unit code associated with a unit of product to a supplier computing device, the unit code being a machine-readable image that embeds a unit identifier (ID) allocated to the unit of product; receiving, from the supplier computing device, a ship message that includes the unit ID, the unit ID having been extracted from a first scan of the unit code by a first scanning device; automatically performing a procurement transaction from the merchant to the supplier for a stocking price for the unit of product upon receipt of the ship message, the stocking price being a first portion of a wholesale price associated with the unit of product; receiving, from a merchant computing device upon detection of a retail sale of the unit of product, a sale message that includes the unit ID, the unit ID having been extracted from a second scan of the unit code by a second scanning device at a point of sale during the retail sale; and automatically performing a supplier share transaction from the merchant to the supplier for a remainder price for the unit of product upon receipt of the sale message, the remainder price being a second portion of the wholesale price.

In some examples, a computer storage medium is provided. The computer storage medium having computer-executable instructions that, upon execution by a processor of a computer, cause the processor to at least: transmit a unit code associated with a unit of product to a first computing device, the unit code being a machine-readable image that embeds a unit identifier (ID) uniquely allocated to the unit of product; receive a first message that includes the unit ID, the unit ID having been extracted from a first scan of the unit code by a first scanning device; automatically perform a first transaction from a first party and to a second party for a stocking price for the unit of product upon receipt of the first message, the stocking price being a first portion of a wholesale price associated with the unit of product; receive a second message that includes the unit ID, the unit ID having been extracted from a second scan of the unit code by a second scanning device at a point of sale for the unit of product; and automatically perform a second transaction from the first party to the second party for a remainder price for the unit of product upon receipt of the second message, the remainder price being a second portion of the wholesale price.

Alternatively, or in addition to the other examples described herein, examples include any combination of the following:

transmit a unit code associated with a unit of product to
    a first computing device;

a unit code being a machine-readable image that embeds a unit identifier (ID) uniquely allocated to the unit of product;

receive a first message that includes the unit ID;

a unit ID is extracted from a first scan of the unit code by a first scanning device;

a scanning device is configured to read one or more of a 1-dimensional and a 2-dimensional, machine-readable image;

automatically perform a first transaction from a first party and to a second party for a stocking price for the unit of product upon receipt of the first message;

a stocking price being a first portion of a wholesale price associated with the unit of product;

a stocking price being a percentage of a wholesale price;

a stocking price being a predetermined price;

receive a second message that includes the unit ID;

a unit ID having been extracted from a second scan of the unit code by a second scanning device at a point of sale for the unit of product;

automatically perform a second transaction from the first party to the second party for a remainder price for the unit of product upon receipt of the second message;

the remainder price being a second portion of the wholesale price;

upon receipt of a third message, generate the unit ID as a unique identifier;

the unit ID being one of a numeric and an alphanumeric code;

generate the unit code as a 2-dimensional machine-readable image;

embedding a unit ID within the unit code;

embedding a UPC within the unit code;

the unit code is a QR code;

the third message includes product data associated with a type of product identifiable by at least a manufacturer identifier and a product type identifier;

associate the unit ID with the product data;

associate the unit ID with a second party identifier assigned to the second party;

determine the stocking price based on the product data associated with the unit ID;

automatically performing the first transaction further includes identifying the second party based on the unit ID;

the first message includes a first party identifier assigned to the first party;

upon receipt of the first message, assign the unit ID to the first party;

automatically performing the second transaction further includes identifying the first party based on the unit ID;

store unit terms assigned to exchanges between the first party and the second party of a product type;

unit terms including at least procurement data defining how the stocking price is determined;

identify that the unit ID is associated with the product type;

determine the stocking price for the first transaction based on the unit terms;

unit terms include a wholesale price;

procurement data includes a procurement percentage;

determining the stocking price includes multiplying the procurement percentage by the wholesale price;

transmit a composite unit code to the first computing device, the composite unit code being associated with a plurality of unit IDs;

receive a third message that includes the composite unit code;

identify the plurality of unit IDs based on the composite unit code;

update the plurality of unit IDs as having been received by the first party;

transmitting a unit code associated with a unit of product to a supplier computing device, the unit code being a machine-readable image that embeds a unit identifier (ID) allocated to the unit of product;

receiving, from the supplier computing device, a ship message that includes the unit ID, the unit ID having been extracted from a first scan of the unit code by a first scanning device;

automatically performing a procurement transaction from the merchant to the supplier for a stocking price for the unit of product upon receipt of the ship message, the stocking price being a first portion of a wholesale price associated with the unit of product;

receiving, from a merchant computing device upon detection of a retail sale of the unit of product, a sale message that includes the unit ID, the unit ID having been extracted from a second scan of the unit code by a second scanning device at a point of sale during the retail sale;

automatically performing a supplier share transaction from the merchant to the supplier for a remainder price for the unit of product upon receipt of the sale message, the remainder price being a second portion of the wholesale price;

upon receipt of a new code request message, generating the unit ID as a unique identifier;

generating the unit code as a 2-dimensional machine-readable image, including embedding at least the unit ID within the unit code;

the new code request message includes a universal product code (UPC) for the unit of product;

storing the UPC with the unit ID;

storing a second party identifier assigned to the supplier with the unit ID;

determining the stocking price based on the UPC stored with the unit ID;

automatically performing the procurement transaction further includes identifying the supplier based on the unit ID;

the ship message includes a merchant identifier assigned to the merchant;

upon receipt of the ship message, assigning the unit ID to the merchant;

automatically performing the supplier share transaction further includes identifying the merchant based on the unit ID;

storing unit terms assigned to exchanges between the merchant and the supplier of a product type, the unit terms including at least procurement data defining how the stocking price is determined;

identifying that the unit ID is associated with the product type; and determine the stocking price for the procurement transaction based on the unit terms.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for transmitting a unit code associated with a unit of product to a supplier computing device, the unit code being a machine-readable image that embeds a unit identifier (ID) allocated to the unit of product; receiving, from the supplier computing device, a ship message that includes the unit ID, the unit ID having been extracted from a first scan of the unit code by a first scanning device; automatically performing a procurement transaction from the merchant to the supplier for a stocking price for the unit of product upon receipt of the ship message, the stocking price being a first portion of a wholesale price associated with the unit of product; receiving, from a merchant computing device upon detection of a retail sale of the unit of product, a sale message that includes the unit ID, the unit ID having been extracted from a second scan of the unit code by a second scanning device at a point of sale during the retail sale; and automatically performing a supplier share transaction from the merchant to the supplier for a remainder price for the unit of product upon receipt of the sale message, the remainder price being a second portion of the wholesale price.

At least a portion of the functionality of the various elements in FIG. 1 to FIG. 5 can be performed by other elements in FIG. 1 to FIG. 5, or an entity (e.g., processor, web service, server, application program, computing device, etc.) not shown in FIG. 1 to FIG. 5.

In some examples, the operations illustrated in FIG. 1 through FIG. 4 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An inventory management system comprising:
   at least one processor; and
   at least one memory comprising computer-readable instructions, the at least one processor, the at least one memory and the computer-readable instructions configured to cause the at least one processor to:
   transmit a unit code associated with a unit of product and a composite unit code to a first computing device, the unit code being a machine-readable image that embeds a unit identifier (ID) uniquely allocated to the unit of product, the composite unit code being a second machine-readable image that embeds a composite unit ID associated with a plurality of unit IDs including the unit ID, the composite unit code being affixed to a container including a plurality of coded units;

store a state for the unit ID as a first state in a database;

receive a first message that includes the composite unit ID, the composite unit ID having been extracted from a first scan of the composite unit code by a first scanning device;

in response to the first message, update the state for the unit ID in the database from the first state to a second state;

automatically perform a first transaction from a first party and to a second party for a stocking price for the unit of product upon receipt of the first message, the stocking price being a first portion of a wholesale price associated with the unit of product;

receive a second message that includes the unit ID, the unit ID having been extracted from a second scan of the unit code by a second scanning device at a point of sale for the unit of product; and automatically perform a second transaction from the first party to the second party for a remainder price for the unit of product upon receipt of the second message, the remainder price being a second portion of the wholesale price.

2. The inventory management system of claim 1, wherein the computer-readable instructions are further configured to cause the at least one processor to:

upon receipt of a third message, generate the unit ID as a unique identifier; and generate the unit code as a 2-dimensional machine-readable image, including embedding at least the unit ID within the unit code.

3. The inventory management system of claim 2, wherein the third message includes product data associated with a type of product identifiable by at least a manufacturer identifier and a product type identifier, wherein the computer-readable instructions are further configured to cause the at least one processor to:

associate the unit ID with the product data;

associate the unit ID with a second party identifier assigned to the second party; and determine the stocking price based on the product data associated with the unit ID, wherein automatically performing the first transaction further includes identifying the second party based on the unit ID.

4. The inventory management system of claim 1, wherein the first message includes a first party identifier assigned to the first party, wherein the computer-readable instructions are further configured to cause the at least one processor to:

upon receipt of the first message, assign the unit ID to the first party, wherein automatically performing the second transaction further includes identifying the first party based on the unit ID.

5. The inventory management system of claim 1, wherein the computer-readable instructions are further configured to cause the at least one processor to:

store unit terms assigned to exchanges between the first party and the second party of a product type, the unit terms including at least procurement data defining how the stocking price is determined;

identify that the unit ID is associated with the product type; and determine the stocking price for the first transaction based on the unit terms.

6. The inventory management system of claim 5, wherein the unit terms further include a wholesale price, wherein the procurement data includes a procurement percentage, wherein determining the stocking price includes multiplying the procurement percentage by the wholesale price.

7. The inventory management system of claim 1, wherein the computer-readable instructions are further configured to cause the at least one processor to:

in response to the second message, update the state for the unit ID in the database from the second state to a third state, wherein the first state indicates the unit of product in inventory of the first party, the second state indicates the unit of product in inventory of the second party, and the third state indicates a sold state of the unit of product.

8. A computer-implemented method for managing inventory exchanges between a supplier and a merchant, the computer-implemented method comprising:

transmitting a unit code associated with a unit of product and a composite unit code to a supplier computing device, the unit code being a machine-readable image that embeds a unit identifier (ID) allocated to the unit of product, the composite unit code being a second machine-readable image that embeds a composite unit ID associated with a plurality of unit IDs including the unit ID, the composite unit code being affixed to a container including a plurality of coded units;

storing a state for the unit ID as a first state in a database;

receiving, from the supplier computing device, a ship message that includes the composite unit ID, the composite unit ID having been extracted from a first scan of the composite unit code by a first scanning device;

in response to the ship message, updating the state for the unit ID in the database from the first state to a second state;

automatically performing a procurement transaction from the merchant to the supplier for a stocking price for the unit of product upon receipt of the ship message, the stocking price being a first portion of a wholesale price associated with the unit of product;

receiving, from a merchant computing device upon detection of a retail sale of the unit of product, a sale message that includes the unit ID, the unit ID having been extracted from a second scan of the unit code by a second scanning device at a point of sale during the retail sale; and automatically performing a supplier share transaction from the merchant to the supplier for a remainder price for the unit of product upon receipt of the sale message, the remainder price being a second portion of the wholesale price.

9. The computer-implemented method of claim 8, further comprising:

upon receipt of a new code request message, generating the unit ID as a unique identifier; and generating the unit code as a 2-dimensional machine-readable image, including embedding at least the unit ID within the unit code.

10. The computer-implemented method of claim 9, wherein the new code request message includes a universal product code (UPC) for the unit of product, the computer-implemented method further comprising:

storing the UPC with the unit ID;

storing a second party identifier assigned to the supplier with the unit ID; and determining the stocking price based on the UPC stored with the unit ID, wherein automatically performing the procurement transaction further includes identifying the supplier based on the unit ID.

11. The computer-implemented method of claim 8, wherein the ship message includes a merchant identifier assigned to the merchant, the computer-implemented method further comprising:

upon receipt of the ship message, assigning the unit ID to the merchant, wherein automatically performing the supplier share transaction further includes identifying the merchant based on the unit ID.

12. The computer-implemented method of claim 8, the computer-implemented method further comprising:

storing unit terms assigned to exchanges between the merchant and the supplier of a product type, the unit terms including at least procurement data defining how the stocking price is determined;

identifying that the unit ID is associated with the product type; and determine the stocking price for the procurement transaction based on the unit terms.

13. The computer-implemented method of claim 12, wherein the unit terms further include a wholesale price, wherein the procurement data includes a procurement percentage, wherein determining the stocking price includes multiplying the procurement percentage by the wholesale price.

14. The computer-implemented method of claim 8, wherein the remainder price is the wholesale price minus the stocking price.

15. A non-transitory computer storage medium having computer-executable instructions that, upon execution by a processor of a computer, cause the processor to at least:

transmit a unit code associated with a unit of product and a composite unit code to a first computing device, the unit code being a machine-readable image that embeds a unit identifier (ID) uniquely allocated to the unit of product, the composite unit code being a second machine-readable image that embeds a composite unit ID associated with a plurality of unit IDs including the unit ID, the composite unit code being affixed to a container including a plurality of coded units;

store a state for the unit ID as a first state in a database;

receive a first message that includes the composite unit ID, the composite unit ID having been extracted from a first scan of the composite unit code by a first scanning device;

in response to the first message, update the state for the unit ID in the database from the first state to a second state;

automatically perform a first transaction from a first party and to a second party for a stocking price for the unit of product upon receipt of the first message, the stocking price being a first portion of a wholesale price associated with the unit of product;

receive a second message that includes the unit ID, the unit ID having been extracted from a second scan of the unit code by a second scanning device at a point of sale for the unit of product; and automatically perform a second transaction from the first party to the second party for a remainder price for the unit of product upon receipt of the second message, the remainder price being a second portion of the wholesale price.

16. The non-transitory computer storage medium of claim 15, wherein the computer-executable instructions, when executed by a processor of the computer, further cause the computer to:

upon receipt of a third message, generate the unit ID as a unique identifier; and generate the unit code as a 2-dimensional machine-readable image, including embedding at least the unit ID within the unit code.

17. The non-transitory computer storage medium of claim 16, wherein the third message includes product data associated with a type of product identifiable by at least a manufacturer identifier and a product type identifier, wherein the computer-executable instructions, when executed by a processor of the computer, further cause the computer to:

associate the unit ID with the product data;

associate the unit ID with a second party identifier assigned to the second party; and determine the stocking price based on the product data associated with the unit ID, wherein automatically performing the first transaction further includes identifying the second party based on the unit ID.

18. The non-transitory computer storage medium of claim 15, wherein the first message includes a first party identifier assigned to the first party, wherein the computer-executable instructions, when executed by a processor of the computer, further cause the computer to:

upon receipt of the first message, assign the unit ID to the first party, wherein automatically performing the second transaction further includes identifying the first party based on the unit ID.

19. The non-transitory computer storage medium of claim 15, wherein the computer-executable instructions, when executed by a processor of the computer, further cause the computer to:

store unit terms assigned to exchanges between the first party and the second party of a product type, the unit terms including at least procurement data defining how the stocking price is determined;

identify that the unit ID is associated with the product type; and determine the stocking price for the first transaction based on the unit terms.

20. The non-transitory computer storage medium of claim 19, wherein the unit terms further include a wholesale price, wherein the procurement data includes a procurement percentage, wherein determining the stocking price includes multiplying the procurement percentage by the wholesale price.

* * * * *